March 17, 1931.  F. A. HOWARD  1,796,789
AIRCRAFT
Filed June 11, 1925   5 Sheets-Sheet 1

Frank A. Howard  Inventor
By  C. A. Straw
   Attorney

March 17, 1931.  F. A. HOWARD  1,796,789
AIRCRAFT
Filed June 11, 1925   5 Sheets-Sheet 2

Frank A. Howard  Inventor
By [signature]  Attorney

March 17, 1931.　　F. A. HOWARD　　1,796,789
AIRCRAFT
Filed June 11, 1925　　5 Sheets-Sheet 3

Frank A. Howard　Inventor

By　Attorney

March 17, 1931.  F. A. HOWARD  1,796,789
AIRCRAFT
Filed June 11, 1925   5 Sheets-Sheet 4
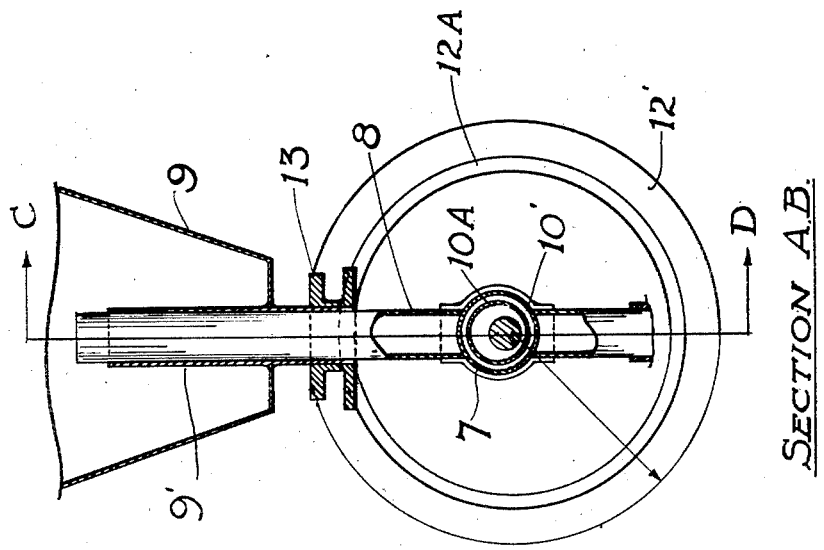
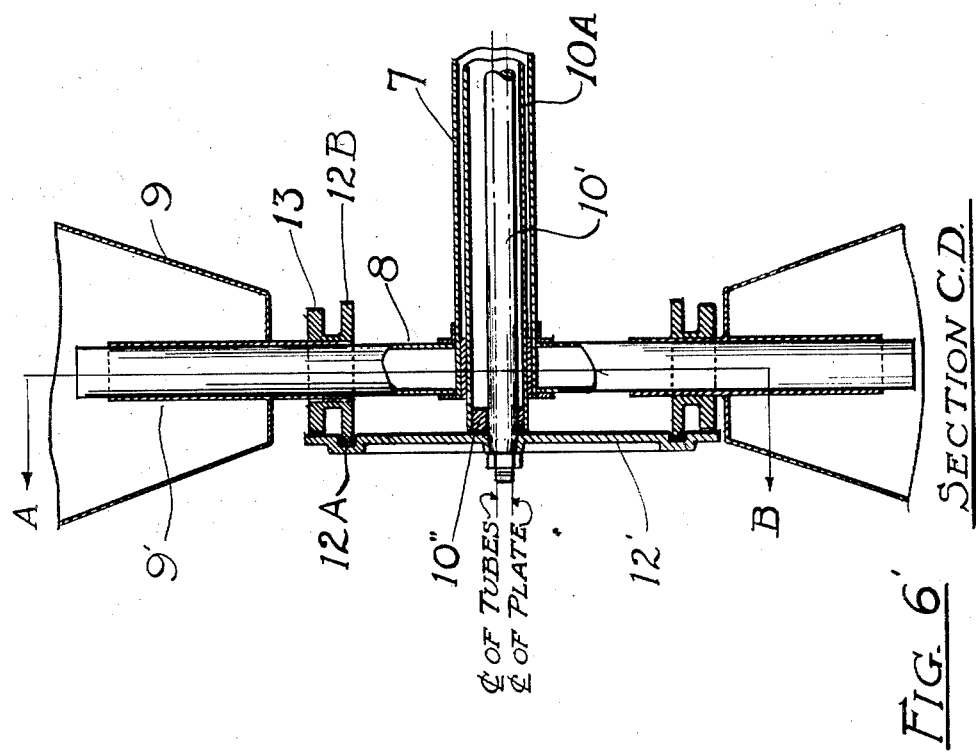
Frank A. Howard Inventor
By Attorney

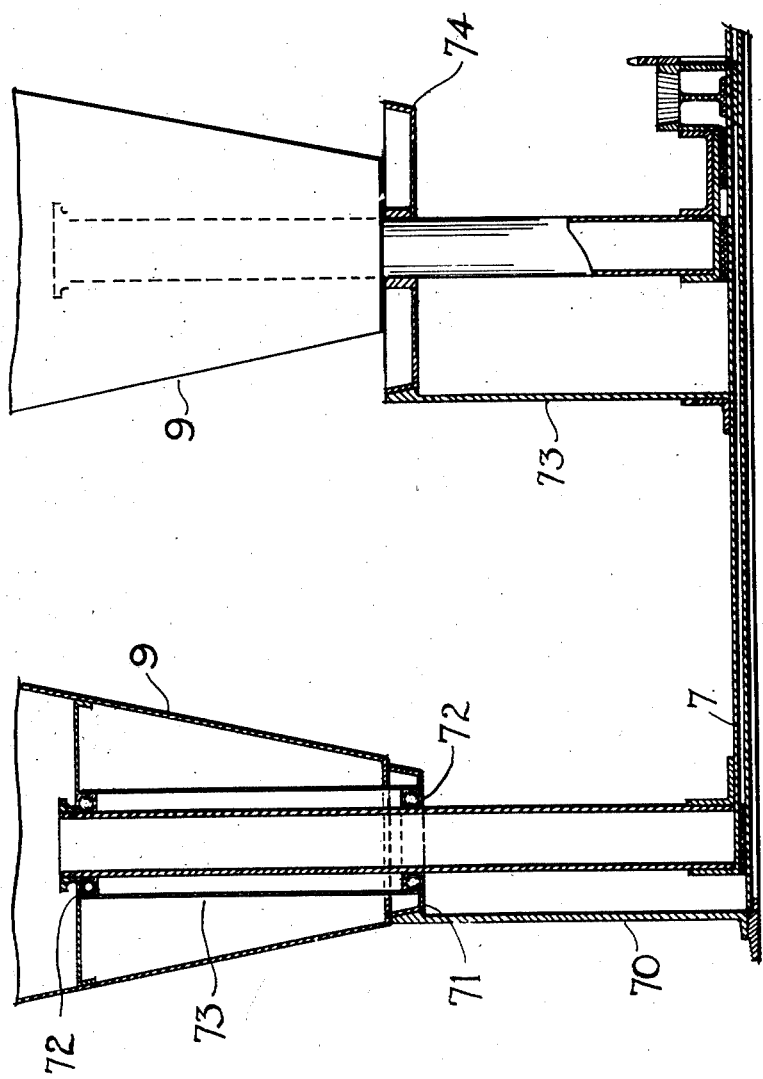

Patented Mar. 17, 1931

1,796,789

UNITED STATES PATENT OFFICE

FRANK A. HOWARD, OF ELIZABETH, NEW JERSEY, ASSIGNOR TO STANDARD OIL DEVELOPMENT COMPANY, A CORPORATION OF DELAWARE

AIRCRAFT

Application filed June 11, 1925. Serial No. 36,527.

The present invention relates to improvements in aircraft and will be fully understood from the following specification, taken in connection with the accompanying drawings.

Figure 2:
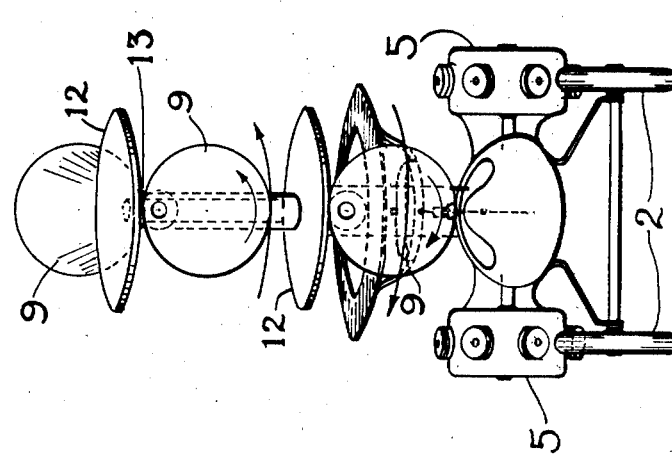
Figure 1:
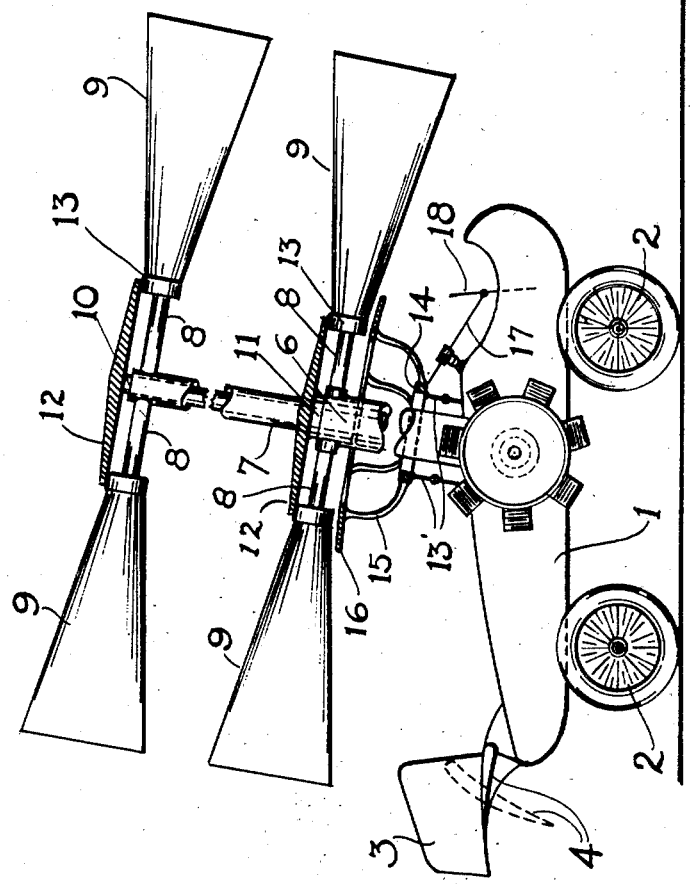
Figure 3:
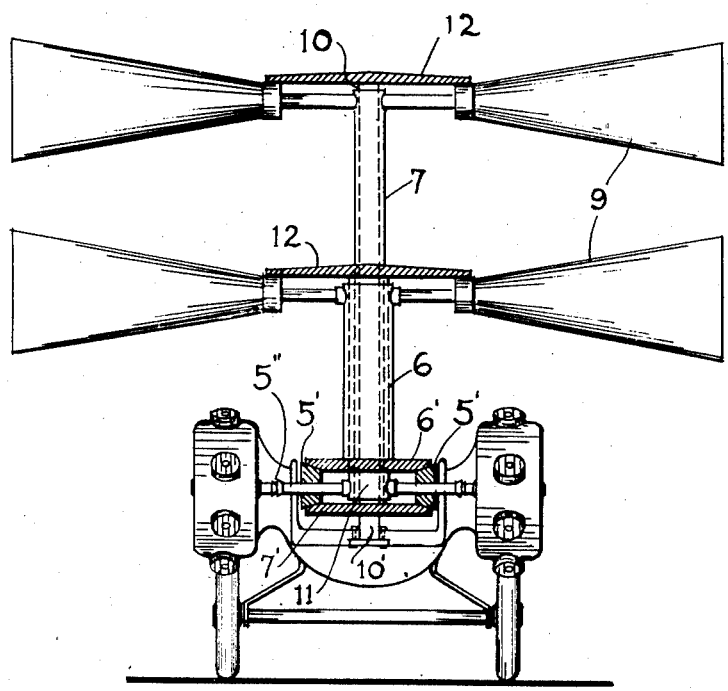
Figure 5:
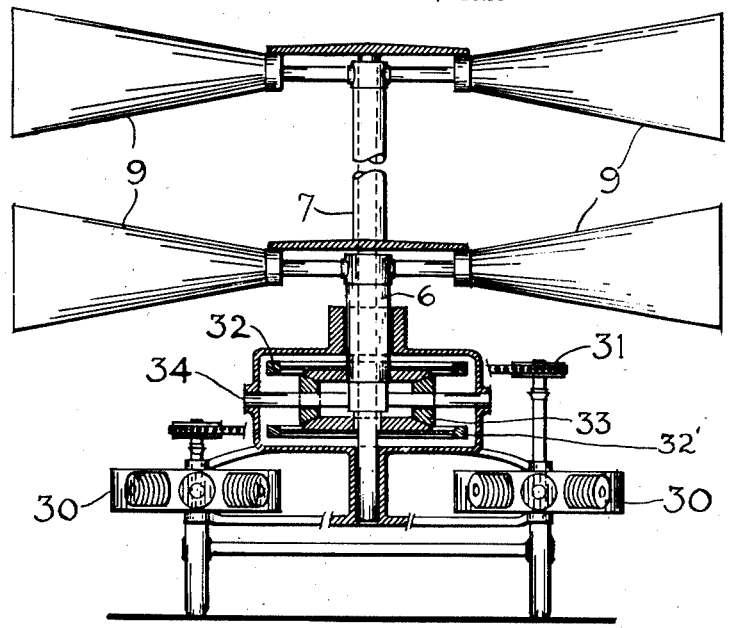
Figure 4:
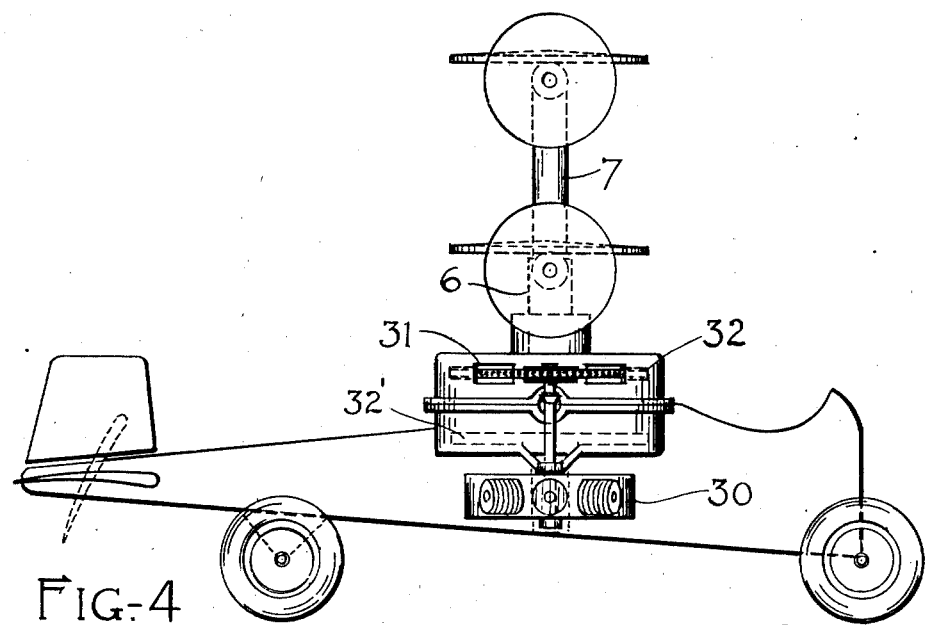

In these drawings, Figure 1 is a side-elevation, partly in section, of a form of helicopter constructed in accordance with the present invention; Figure 2 is a four-elevation of the same; Figure 3 is a cross-sectional view illustrating the driving mechanism; Figure 4 is a side-elevation of a modified form of helicopter; Figure 5 is a cross-section, similar to Figure 3, of this modified construction; Figure 6 is a detailed sectional view showing a means for balancing the helicopter; Figure 6' is an additional section of the same; and Figure 7 is a detailed longitudinal section of a modified construction.

Referring first to Figure 1, the form of aircraft there illustrated comprises a fuselage, designated 1, supported on wheels 2 in the usual manner. The tail of the fuselage has the usual rudder 3 and elevator 4, controlled from the pilot seat in the customary manner. The center of the fuselage carries two independent driving motors, designated 5, which, as shown, may be of the stationary radial-cylinder type. These driving motors drive, through mechanism which will be later referred to, a pair of driving sleeves 6—7, which are arranged to be turned in opposite directions by the driving mechanism.

In the construction illustrated, the axis of the driving sleeves 6—7 is inclined forwardly with respect to the center line of the fuselage. Each driving sleeve carries a pair of oppositely disposed radial arms 8, on which are journaled for rotation drums 9. As illustrated, the drums are devoid of substantial protuberances or other irregularities which might produce tangential air streams and thereby absorb work in imparting mass velocity to the air. The drums 9 constitute the elevating surfaces of the machine. Co-axial with the driving sleeves 6 and 7, there is a stationary shaft 10 and a stationary sleeve 11, each of which carries at its upper extremity a horizontal circular friction table 12. At the inner extremity of each of the drums 9, there is a friction drum member 13, which rolls upon the stationary friction table 12.

Secured to the fuselage by four rigid links 13', there is a balance ring 14. The links 13' are mounted in ball joints for limited angular movement in any direction at both extremities. The balancing ring 14 carries by spider-arms 15 a balancing surface 16 in the form of an annulus which when in its central position is concentric with the driven sleeve 6, and of such width as to mask only the inner and relatively ineffective portion of the surface of the lower drums 9. A link 17 connects the balance ring 14 with the regular control stick 18, by which the elevator 4 of the machine is controlled, the mounting of this stick being the same as that used in standard practise, where both elevator and ailerons are controlled by the longitudinal or lateral displacement of the stick. In the present instance, however, there being no ailerons, lateral movement effects only a lateral displacement of the balance ring 14, whereas longitudinal movement of the stick 18 effects both the longitudinal displacement of the balance ring 14 and control of the elevator 4.

The operation of the aircraft illustrated is as follows:

By suitable driving gears, which will hereinafter be particularly described, the two motors 5 rotate the drive-sleeves in opposite directions. By virtue of such rotation of the drive sleeves, the drums 9 move in opposite circular paths about the axis of the drive sleeves, and in such motion, by the cooperation of the stationary tables 12 and the friction drums 13, the drums 9 rotate upon their own shafts. The arrangement is such that each of the drums rotates on its own axis, with its lower surface moving in the same direction as the drum itself moves in its revolution about the main axis of the machine. These relative directions of rotation and revolution are plainly shown by the direction of the arrows in Figure 2. The diameter ratios of the tables 12 and of the friction drums 13 are arranged to give a mean surface speed of the drums preferably in the neighborhood of three to four times the mean rotational velocity of the drums about the drive axis of the machine; i. e., the effective diameter of the friction table 12 may be, for example, from one and one-half to two times the effective diameter of the friction drums 13, varying according to the diameter of the drums 9. By this arrangement, there is attained a lifting effect from the drums 9 which is relatively great as compared with their projected areas.

The desirable design of a machine of this type requires that the center of gravity should lie on the axis of the driveshafts 6 and 7, or as near thereto as is practicable, and preferably, if displaced from this axis, such displacement should be in a fore-and-aft line rather than in a lateral line.

Stability of the machine in flight is obtained primarily by shifting the balance ring 14, thereby moving the balancing surface or member 16 fore and aft or laterally to mask a greater or less proportion of the lift circle of the lower drums 9, thus displacing the center of lift of the machine. Fore and aft stability is further attained when steerageway of the machine has been obtained by operation of the elevator 4 in the usual manner. The inclination of the main axis of the drive-shafts, that is, of the sleeves 6 and 7, to the axis of the fuselage is merely for convenience in securing an approximately horizontal position of the fuselage in normal flight, at which time the lifting force of the drums 9 is exerted not only to overcome the attraction of gravity but to provide a horizontal force component giving forward motion.

Side-slip of the machine on turns is prevented, as in the case of an airplane, by banking the machine, such banking being attained through the manipulation of the masking surface 16, the effect of which is similar to the operation of ailerons on an airplane, as regards lateral stability.

A machine of the type illustrated may lift itself vertically, or substantially vertically, and may descend in the same manner.

In Figure 3, it will be seen that the driving sleeve 6 carries on its lower extremity a bevel wheel 6', with which the driving bevel pinions 5' of the motorshafts co-act. The inner extremities of the motorshafts bear in and serve as supports for the stationary sleeve 11, which carries the lower friction table 12. The drive-sleeve 7 carries an oppositely facing bevel wheel 7', which likewise co-acts with the bevel driving pinions 5' but is driven in the opposite direction. The central stationary shaft 10, which carries the upper friction table 12, is affixed to the frame of the machine at its base, as shown at 10' in Figure 3. Preferably, there is inserted in each of the motor driveshafts an overrunning clutch 5''. By this arrangement, both motors normally drive at the same speed but in opposite directions the sleeves 6 and 7, thus balancing the torque on the machine, as is required in devices of this character. Should either motor fail, the load of the dead motor is automatically released by the automatic clutch 5'', so that the remaining motor needs to carry only the effective driving load.

In Figures 4 and 5 there is illustrated a modified construction, in which the driving motors, designated 30, have their shafts vertically arranged, the drive in this case being attained by means of chains 31, which drive sprockets 32—32' keyed respectively to the sleeves 6 and 7. Each sprocket carries in addition a bevel wheel meshing with a pair of rotatable bevel pinions 33 carried on stationary shafts 34. As before, the shafts of the driving motors carry overrunning clutches, and by reason of the interconnection of the sprockets 32—32' through the bevel wheels and pinions described, the failure of either motor permits the other one to automatically carry the driving load without being burdened with the load of the dead motor.

In Figures 6 and 6', there is illustrated a modified method of securing control of the stability of the machine. In this view, the top friction table, designated 12', is not affixed directly to a stationary shaft 10, as in Figs. 1 to 5, but is carried on an inner shaft 10', being mounted eccentrically thereon. The inner shaft 10' in turn is rotatable in a hole bored eccentrically in a bushing 10'' affixed to a control sleeve 10A. Both the central shaft 10' and the sleeve 10A extend through the rotating shaft 7 and out of the base thereof, being there provided with control levers, not illustrated, by which they may be oscillated. By this combination of the eccentrically mounted table in the eccentric bushing, it is possible to move the table 12' so that its center occupies any position lying within a circle the diameter of which is limited only by the throw of the two eccentrics. In this manner, by the simultaneous operation of the two eccentric motions, the center of the table 12' can be moved along in a straight line parallel to the axes of the rotating cylinders for a distance equal to twice the eccentricity. The table 12' has a groove 12A, in which there rotates a guide roller 12B forming a part of the friction drum 13. It will be understood that the drum 9 freely rotates on the arm 8.

By the arrangement described, adjustment of the eccentric mountings of the table 12' will displace the guide groove 12A in the desired direction and to any desired extent within the limit of the throw of the eccentrics, and, by consequence, the friction drums 13 no longer revolve concentrically with the driving sleeve 7 but rather in an eccentric path. As a result of following such eccentric path, the friction drums 13, as well as the lifting drums 9, are accelerated during 180° of their travel around the friction table and proportionately slowed during the remaining 180°. The effect of this action is to change the relative rotational speeds of the surfaces of the lifting drums 9 at various points in their travel, and this similarly displaces the center of lift of the pair of rotating drums in the direction of movement of the friction table 12'. The mechanism described therefore presents another method of accomplishing the result, i. e., control of stability of the machine, which is effected in Figure 1 by displacement of the masking surface 16.

In Figure 7, there is illustrated a modification of the means for driving the drums 9, in which modification the upper friction table is replaced by a stationary bevel wheel or friction surface 70 cooperating with a bevel pinion or friction wheel 71 secured to the end of the drum 9. There is also illustrated here the bearing arrangements for the drum 9, such arrangements consisting of a pair of ball bearings 72, arranged at the opposite ends of a sleeve 73, which extends only a part of the length of the drums 9. The outer section of the drums therefore represents a cantilever construction, which is of advantage in view of the fact that the form of the said drums makes them well suited to bearing a maximum bending strain.

In Figure 7, the driving arrangements have further been modified in that the lower friction table, here designated 73, is mounted directly on the sleeve 7, thus dispensing with the intermediate stationary sleeve 11 illustrated in Figure 1. This requires readjustment of the gear ratios of the bevel wheel 73 and pinion 74 by which the lower drum 9 is driven, and further results in the modification of the driving mechanism, in an obvious manner, as is necessitated by the elimination of the intermediate stationary sleeve.

In the drawings, I have illustrated the drums 9 as being of conical form, the pitch of the cones being such as to give an approximately constant ratio of rotational to translational velocity of their surfaces (considering translational velocity as being the velocity of the surfaces in their main orbits about the drive sleeves 6 and 7). This construction I believe to be the most efficient, but not essential, either plain cylindrical drums, modified cones of less pitch, or other solids of revolution being operative.

The aircraft construction illustrated and described in various modifications and forms in the foregoing is primarily designed for machines of limited and rather low velocity as compared with that attainable in airplanes, but having the compensating advantage of ability to rise and descend in an approximately vertical line, and the further advantage of great compactness as compared with airplanes of similar lifting power.

What I claim is:

1. An aircraft which comprises a frame, an approximately vertical shaft mounted therein, elongated drums extending radially from said shaft, said drums being solids of revolution devoid of substantial protuberances, means for revolving the drums around the shaft, means for rotating the drums around their respective axes in such direction that the under surface of said drums travels in the same direction as the drums about the shaft, and means carried by the aircraft for shifting the effective lifting surface of said drums.

2. An aircraft comprising a frame, lifting surfaces mounted thereon, means for revolving said surfaces in a generally horizontal plane, means for rotating the surfaces on their own axes, a masking member on the aircraft and normally positioned substantially out of effective relation to said surfaces, and means for adjusting said masking member to shift the lifting action of said lifting surfaces.

3. An aircraft comprising a frame, an approximately vertical shaft mounted therein, drums extending radially from the shaft, said drums being solids of revolution devoid of substantial protuberances, means for revolving the drums around the shaft, means for rotating the drums about their respective axes in such direction that the under surface of the drums travels in the same direction as the drums around the shaft, a balancing member carried by the aircraft and normally substantially out of effective relation to the drums, and means for adjusting the balancing member to mask a portion of the effective lifting surface of the drums.

4. An aircraft according to claim 3 in which the balancing member is an annulus surrounding the shaft from which lifting drums extend, said annulus being arranged adjacent lifting drums and beneath the same.

5. An aircraft according to claim 3, in which the balancing member is supported by a balancing ring encircling the shaft from which lifting drums extend, and means connected with the controls of the aircraft for shifting said ring both laterally and longitudinally of the aircraft.

6. An aircraft comprising a frame, an approximately vertical shaft mounted therein, two sets of drums arranged one set above the other and extending radially from said shaft, said drums being solids of revolution devoid of substantial protuberances, driving shafts for revolving the sets of drums in opposite directions, means for rotating the drums about their respective axes in such direction that the under surface of said drums travels in the same direction as the drums about the shaft, the means for rotating one set of drums being carried by the driving shaft of the other set of drums.

7. An aircraft which comprises a frame, an approximately vertical shaft mounted therein, elongated drums extending radially from said shaft, means for revolving the drums around the shaft, means for rotating the drums about their respective axes in such direction that the under surface of said drums travels in the same direction as the drums about the shaft, and means for shifting the lifting surface of the drums.

FRANK A. HOWARD.